> United States Patent Office 3,758,439
Patented Sept. 11, 1973

3,758,439
THERMOSETTING COMPOSITIONS CONTAINING MONOMERIC HYDROXYALKYL ACRYLIC ESTER AND POLYMER OF ACRYLONITRILE
Lawrence M. Fodor, Bartlesville, Okla., assignor to Phillips Petroleum Company
No Drawing. Filed Apr. 23, 1971, Ser. No. 137,017
Int. Cl. C08f 15/00
U.S. Cl. 260—41 R          22 Claims

ABSTRACT OF THE DISCLOSURE

Thermosetting compositions comprising a polymer of acrylonitrile and a hydroxyalkyl ester of an unsaturated acid are readily converted to novel thermoset resins at elevated temperatures and pressures in the presence of free radical initiators.

BACKGROUND OF INVENTION

This invention relates to thermoset resin compositions containing nitrile polymers. In another aspect it relates to a process for the preparation of thermoset resin compositions. In still another aspect it relates to novel thermosetting compositions.

The rapidly expanding plastics industry continually seeks to find new and improved resins. Resins that contain amounts of acrylonitrile have particular value because the incorporation of acrylonitrile tends to increase thermal stability and resistance to oils. Such resins, particularly those having relatively high acrylonitrile content, tend to find utility anywhere high temperature stability and resistance to oils are important. Examples of such uses would be for molded plastic articles used in and about internal combustion engines.

The usual method of molding resins containing polymerized acrylonitrile requires preparing a preform of the article to be molded, sintering the preform and then molding at high temperature. This is required since polyacrylonitrile and copolymers of high acrylonitrile content tend to decompose in ordinary molding procedures requiring high temperatures before they melt. This method is uneconomical since it requires considerable time and effort to achieve the desired product.

An object of this invention is to provide new thermosetting compositions.

It is another object of this invention to provide a process for producing thermoset resins.

It is still another object of this invention to provide novel thermoset resin compositions.

DESCRIPTION OF PREFERRED EMBODIMENTS

I have found that compositions comprising a resin portion, which is itself comprised of a polymer of acrylonitrile and a hydroxyalkyl ester of an unsaturated acid, in combination with an organic peroxide of the type normally used to initiate free radical polymerization are easily molded, using conventional techniques of injection and compression molding, at elevated temperatures and pressures and form thermoset resins having very desirable physical properties. These thermosetting compositions may contain high percentages of the polymer of acrylonitrile. The percentage may be as high as 95 percent by weight of the resin portion. Especially good results are found for those thermosetting compositions where the percentage of the polymer of acrylonitrile ranges from 60 to 90 percent by weight of the total resin portion.

Generally one or more of the physical properties of flexural modulus and flexural strength as measured by ASTM Test D790, tensile strength and percent elongation as measured by ASTM Test D638, Vicat softening point as measured by ASTM Test D1525, Shore D hardness as measured by ASTM Test D2240 and density as measured by ASTM Test D1505 may be favorably affected for the thermoset resins prepared from these compositions.

The monomeric hydroxyalkyl ester of an unsaturated acid used in the resin portion of these thermosetting compositions has the formula

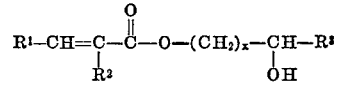

wherein $R^1$, $R^2$, and $R^3$ may be the same or different and are selected from hydrogen and alkyl radicals having 1 to 5 carbon atoms and $x$ is an integer from 0 to 4. Examples of such esters include but are not limited to the following:

2-hydroxyethyl acrylate
3-hydroxypropyl acrylate
2-hydroxypropyl acrylate
2-hydroxyethyl methacrylate
3-hydroxypropyl crotonate
5-hydroxypentyl acrylate
2-hydroxyethyl 2-octenoate
2-hydroxyethyl 2-pentylacrylate.

Of the above esters it is preferred to use 2-hydroxyethyl acrylate and 3-hydroxypropyl acrylate.

The polymer of acrylonitrile used in the thermosetting composition may be a homopolymer of acrylonitrile (polyacrylonitrile), a copolymer of acrylonitrile with another unsaturated monomer, a blend of polyacrylonitrile with one or more copolymers, or a blend of two or more copolymers. The unsaturated monomers which may be incorporated into the copolymers with acrylonitrile may include the esters of unsaturated acids such as ethyl acrylate, methyl methacrylate, butyl acrylate, and the like. Preferred copolymers are those of acrylonitrile and conjugated dienes of 4 to 10 carbon atoms such as 1,3-butadiene, isoprene, piperylene, 1,3-hexadiene, 1,3-decadiene and the like. The mole ratio of conjugated diene to acrylonitrile monomers present in the copolymer may vary from 0.5 to 3. A preferred ratio has the value of 1.

When desired a crosslinking agent may be employed as part of the resin portion of the thermosetting composition. Suitable crosslinking agents for use in this invention include polymerizable monomers having 2 or more unsaturated carbon-carbon bonds. Typical of these types of compounds but not limited thereto are the following:

divinylbenzene
divinylcyclohexane
trivinylcyclohexane
allylacrylate
vinylcyclohexene
1,4 pentadiene
1,5 hexadiene Presently preferred for use in this invention is divinylbenzene. If divinylbenzene is used for this purpose it serves, generally, to increase flexural modulus, flexural strength, and tensile strength with a corresponding reduction in percent elongation.

Of 100 parts by weight of the resin portion of the thermosetting composition, the hydroxyalkyl ester should comprise 5 or more parts and will generally comprise 5 to 50 parts. A preferred range is 10 to 40 parts. The polymer of acrylonitrile should not exceed 95 parts and will generally comprise 50 to 95 parts of the resin portion of the thermosetting composition in order to make the best advantage of the high temperature stability and oil resistance it imparts. A preferred range is 60 to 90 parts.

It has been found particularly useful to use, for the polymer of acrylonitrile, either polyacrylonitrile alone or a blend of polyacrylonitrile and a copolymer of acrylonitrile and butadiene having a ratio of monomers varying from 0.25 to 3. The polyacrylonitrile may have a viscosity in the range of 0.1 to 10. The preferred copolymer is rubbery and has a butadiene to acrylonitrile monomer ratio of 1. It should be noted here that the molecular weight of acrylonitrile is 53 while that of butadiene is 54. Thus, a polymer having a mole ratio of 1 is made up of about 50 weight percent of each. Hereinafter, when reference is made to this specific copolymer these ratios are implied. When the blend is used, of 100 parts by weight of the resin portion of the thermosetting composition 0 to 40 parts may be the copolymer so long as the total parts of copolymer and polyacrylonitrile fall within the range of 50 to 95 parts of the resin portion. However, when the blend is used polyacrylonitrile will generally make up 60 to 90 parts by weight of the resin portion and the copolymer will be in the range of 0 to 30 parts by weight of the resin portion. The best balance of properties are obtained when the polyacrylonitrile makes up 60 to 70 parts of the resin portion and the copolymer makes up 10 to 30 parts.

If a crosslinking agent, such as divinylbenzene, is desired it may be incorporated in up to about 10 parts of the 100 parts by weight of the resin portion of the thermosetting composition.

The peroxide initiator, used to cause the thermosetting reaction, may be of any type used to initiate free radical polymerization. Typical initiators are compounds such as dibenzoylperoxide, dicumylperoxide, di-t-butylperoxide and the like. Of particular utility for this invention is 2,5-bis(t-butylperoxy)-2,5-dimethylhexane. The amount of initiator employed is not critical so long as sufficient initiator is present to insure the occurrence of a thermosetting reaction. The amount of initiator usually employed in the thermosetting composition will not exceed about 8 parts by weight initiator combined with 100 parts by weight of the resin portion of the thermosetting composition. A range of 0.5 to 5 parts initiator with 100 parts resin portion is preferred.

If desired, the thermosetting composition may be combined with a filler prior to thermosetting. The use of a filler tends to increase hardness and reduce percent elongation (increase stiffness) while maintaining or improving flexural modulus, flexural strength and tensile strength in the thermoset resin. The fillers also tend to increase the density of the thermoset resins into which they are incorporated. At high levels of filler the flow of the thermosetting composition is reduced to such an extent that molding becomes difficult. Therefore the amount of filler should not exceed about 50 weight percent of the total combined weight of the filler and thermosetting composition. Generally the level of filler will not exceed about 40 weight percent. The best balance of properties usually are obtained when the level of filler does not exceed about 20 weight percent. Typical fillers include calcium carbonate, clay, silica, talc, asbestos, glass strands and glass spheres.

Though not required, the thermosetting composition may also have incorporated therein a coupling agent to promote adhesion between the filler and resin portion. A variety of substituted silanes including the tris(aminoalkyl) vinylsilanes, the tris(hydroxyalkyl) vinylsilanes, di- and trihalo vinylsilanes (e.g. methyldichlorovinylsilane). The tris(alkoxy) vinylsilanes, including such members as tris(methoxy) vinylsilane, tris(ethoxy) vinylsilane, tris(n-propoxy) vinylsilane, tris(2-ethoxyethoxy) vinylsilane and, particularly, tris(2-methoxyethoxy) vinylsilane are preferred in this invention. The quantity of vinylsilane used for this purpose may vary but should not exceed about 2 parts per 100 parts of filler.

The thermosetting composition described above may be subjected to elevated temperatures and pressure, sufficiently high to insure the thermosetting reaction takes place, in conventional injection or compression molding equipment. The temperatures employed are generally from 300 to 500° F. and the pressures employed may vary from 10,000 to 75,000 p.s.i.g. Usually, however, temperatures of 320 to 400° F. and pressures from 15,000 to 40,000 p.s.i.g. are employed. The thermosetting composition is subjected to the temperature and pressure employed for a sufficient time to insure the desired degree of thermosetting. This will vary, of course, depending upon the temperature and pressure used, the makeup of the thermosetting composition, and the presence or absence of a filler. Generally 1 to 20 minutes are satisfactory and no more than 10 minutes is required for most cases.

The following represents a typical procedure employed in the process for preparing the thermosetting compositions and thermoset resins of this invention. The orders of addition, mixing time, temperatures, pressures, molding times, etc. are not to be considered as setting limits to the scope of this invention. They are merely exemplary of those that may be successfully employed.

A Brabender Plastograph, Banbury mixer or other suitable mixing device is charged with the polymer of acrylonitrile and the monomeric hydroxyalkyl ester. If a filler and/or a crosslinking agent is desired they may be included in the charge. The relative proportions of the ingredients will be those described above for the thermosetting compositions. If a Brabender Plastograph is the mixing device used, a temperature of about 212° F. is maintained during mixing and a rotor speed of about 50 revolutions per minute is used. Approximately 10 minutes after beginning the mixing the peroxide is added. Following this addition, mixing is continued for about 5 more minutes. A nitrogen purge may be used but is not essential during mixing. The resulting mixture may be molded at a temperature from 320 to 400° F. and a ram pressure of about 15,000 to 40,000 p.s.i.g. for about 10 minutes in conventional compression molding equipment. When the polymer of acrylonitrile is a blend of an acrylonitrile-butadiene copolymer and polyacrylonitrile it is preferred, though not required, to charge the copolymer first. A portion of the monomeric ester is then added but with care taken to avoid adding such an amount that a mushy mass is obtained. Then the remaining monomeric ester and polyacrylonitrile is charged. If it is desired to add a filler and/or crosslinking agent, they are preferably added at the same time or after the polyacrylonitrile is added. When an adhesion promoting agent is used it may be added at the same time as the filler.

A specific recipe used in a representative test of this invention comprised 10 grams of a rubbery acrylonitrile-butadiene copolymer wherein the mole ratio of the monomers was 1, which contained about 50 weight percent acrylonitrile, 8 grams of 2-hydroxyethyl acrylate, 30 grams of polyacrylonitrile having an inherent viscosity of 0.78 in dimethyl formamide at 30° C., 2 grams of divinylbenzene, and 1 gram of 2,5-bis(t-butylperoxy)-2,5-dimethylhexane. The resulting thermosetting composition was a free flowing powder having the desirable property of being freely distributed within a mold.

The following examples will serve to clarify the many advantages of this invention. The individual runs were made using thermosetting compositions prepared according to the process described above, having variable proportions of ingredients which were compression molded to produce the test samples of thermoset resin for which a number of physical properties were determined. Where a blend of polyacrylonitrile and rubbery copolymer of butadiene and acrylonitrile was used the mole ratio of the monomers in the copolymer was 1 and the copolymer contained about 50 weight percent acrylonitrile.

The data are presented in tabular form for convenience. The resin portion of the thermosetting composition is given in parts by weight of the different components. The following definitions will be useful in interpreting the data.

(1) EA=ethyl acrylate
(2) HEA=2-hydroxyethyl acrylate
(3) HPA=3-hydroxypropyl acrylate
(4) NR=rubbery copolymer of acrylonitrile and butadiene
(5) PAN=polyacrylonitrile
(6) DVB=divinylbenzene
(7) Percent AN=total percentage of acrylonitrile in the resin portion determined as the sum of the parts by weight of PAN plus one half the parts by weight of NR if any.*
(8) IV=inherent viscosity of polyacrylonitrile determined at 30° C. in dimethyl formamide.
(9) IN.=parts of peroxide initiator combined wtih 100 parts resin portion [in these runs the initiator used was 2,5-bis(t-butylperoxy)-2,5-dimethylhexane].
(10) FM=flexural modulus
(11) T=tensile strength
(12) FS=flexural strength
(13) E=percent elongation
(14) VT=Vicat softening temperature
(15) H=Shore D hardness

EXAMPLE I

This example illustrates the basic improvement in properties of the thermoset resin obtained when a hydroxyalkyl ester of an unsaturated acid is incorporated into the resin portion of the thermosetting composition compared to the properties of a resin prepared using an alkyl ester free of hydroxy groups.

TABLE I

| Run | Ester used | Resin portion | | | Percent AN | IV, PAN | IN. (phr.) | FM (p.s.i.) | T (p.s.i.) | FS (p.s.i.) | E, percent | VT, °F. | H |
|---|---|---|---|---|---|---|---|---|---|---|---|---|---|
| | | NR | PAN | HEA a | | | | | | | | | |
| 1 | EA | 20 | 60 | 20 | 70 | 4.89 | 0.50 | 113 | 930 | 1,720 | 2 | 321 | 66 |
| 2 | HEA | 20 | 60 | 20 | 70 | 3.2 | 0.50 | 86 | 1,590 | | 9 | >500 | 75 |
| 3 | HEA | 20 | 60 | 20 | 70 | 0.78 | 2.0 | 95 | 2,710 | 2,680 | 11 | | 80 |
| 4 | HEA | 20 | 60 | 20 | 70 | 5.36 | 2.0 | 160 | 3,510 | 4,850 | 9 | | 76 |
| 5 | HPA | 20 | 60 | 20 | 70 | 5.36 | 2.0 | 137 | 2,520 | 3,350 | 6 | | 80 | a Ethyl acrylate rather than hydroxyethyl acrylate was used in Run 1; hydroxypropyl acrylate was used in Run 5.

From Table I it can be seen that samples prepared from thermosetting compositions containing a hydroxyalkyl ester of an unsaturated acid exhibit an increased percent elongation and hardness and higher tensile and flexural strength than a similar sample prepared from a thermosetting composition containing an alkyl ester of an unsaturated acid containing no hydroxy groups such as ethyl acrylate (Run 1).

*Since the rubbery copolymer is made up of about 50 weight percent acrylonitrile, the parts by weight acrylonitrile in the copolymer is necessarily one half the total parts by weight of the copolymer.

EXAMPLE II

This example illustrates the variation in properties exhibited by the thermoset resin when varying amounts of the rubbery copolymer and 2-hydroxyethyl acrylate are employed in the thermosetting composition with a fixed amount of polyacrylonitrile.

TABLE II

| Run | Resin portion | | | Percent AN | IV, PAN | IN. (phr) | FM (p.s.i.×50⁻³) | T (p.s.i.) | E, percent | VT, °F. | H |
|---|---|---|---|---|---|---|---|---|---|---|---|
| | NR | PAN | HEA | | | | | | | | |
| 1 | 40 | 60 | 0 | 80 | 3.2 | 0.5 | 42 | 770 | 22 | 262 | 56 |
| 2 | 30 | 60 | 10 | 75 | 3.2 | 0.5 | 31 | 660 | 10 | 377 | 60 |
| 3 | 30 | 60 | 20 | 70 | 3.2 | 0.5 | 86 | 1,590 | 9 | >500 | 75 |
| 4 | 10 | 60 | 30 | 65 | 3.2 | 0.5 | 166 | 2,680 | 6 | 425 | 79 |
| 5 | 0 | 60 | 40 | 60 | 3.2 | 0.5 | 177 | 1,740 | 4 | 380 | 80 |

From Table II it can be seen that the best balance of tensile strength and high Vicat softening temperature in the thermoset resin is obtained at intermediate levels of the rubbery copolymer and 2-hydroxyethyl acrylate. Hardness and flexural modulus tend to increase with decreasing rubbery copolymer content. Percent elongation decreased as rubbery copolymer content decreases.

EXAMPLE III

This example illustrates the difference in properties exhibited by the thermoset resin when the thermosetting composition contains either a low viscosity polyacrylonitrile or a high viscosity polyacrylonitrile.

TABLE III

| Run | Resin portion | | | Percent AN | IV, PAN | IN. (phr) | T (p.s.i.) | E, percent | VT, °F. | H | FM (p.s.i.×50⁻³) |
|---|---|---|---|---|---|---|---|---|---|---|---|
| | NR | PAN | HEA | | | | | | | | |
| 1 | 20 | 60 | 20 | 70 | 3.2 | 0.50 | 1,590 | 9 | >500 | 75 | 86 |
| 2 | 20 | 60 | 20 | 70 | 0.56 | 0.50 | 3,150 | 22 | >500 | 80 | 109 |
| 3 | 10 | 60 | 30 | 65 | 3.2 | 0.50 | 2,280 | 6 | 425 | 79 | 166 |
| 4 | 10 | 60 | 30 | 65 | 0.56 | 0.50 | 3,610 | 17 | >500 | 83 | |

From Table III it can be seen that samples prepared from a thermosetting composition containing low viscosity polyacrylonitrile (Runs 2 and 4) generally exhibit a higher percent elongation, tensile strength, hardness, and flexural modulus when compared to similar samples prepared from a thermosetting composition containing a high viscosity polyacrylonitrile (Runs 1 and 3).

EXAMPLE IV

This example illustrates the properties exhibited by the thermoset resin when the thermosetting composition contains a crosslinking agent such as divinylbenzene (DVB).

TABLE IV

| Run | Resin portion | | | | Percent AN | IV, PAN | IN. (phr.) | FM (p.s.i.×50⁻³) | T (p.s.i.) | FS (p.s.i.) | E, percent |
|---|---|---|---|---|---|---|---|---|---|---|---|
| | NR | PAN | HEA | DVB | | | | | | | |
| 1 | 20 | 60 | 20 | 0 | 70 | 0.78 | 2.0 | 95 | 2,710 | 2,680 | 11 |
| 2 | 20 | 60 | 18 | 2 | 70 | 0.78 | 2.0 | 183 | 3,950 | 4,880 | 8 |
| 3 | 20 | 60 | 16 | 4 | 70 | 0.78 | 2.0 | 232 | 3,740 | 5,720 | 6 |
| 4 | 20 | 60 | 12 | 8 | 70 | 0.78 | 2.0 | 259 | 3,320 | 4,550 | 5 |
| 5 | 20 | 60 | 19 | 1 | 70 | 1.02 | 2.0 | 158 | 3,840 | 3,840 | 12 |
| 6 | 20 | 60 | 17 | 3 | 70 | 1.02 | 2.0 | 237 | 4,040 | 5,100 | 6 |
| 7 | 20 | 60 | 15 | 5 | 70 | 1.02 | 2.0 | 260 | 3,390 | 4,430 | 4 |

From Table IV it can be seen that the samples containing the cross-linking agent exhibit a reduction in percent elongation but show increased flexural modulus, tensile strength and flexural strength when compared with a similar sample containing no crosslinking agent.

EXAMPLE V

This example illustrates the properties exhibited by the thermoset resin when the thermosetting composition has been combined with a filler.

TABLE V

| Run | Resin portion | | | Percent AN | IV, PAN | IN. (phr.) | Filler | | FM (p.s.i.×10⁻³) | T (p.s.i.) | FS (p.s.i.) | E, percent | VT, °F. | H | Density |
|---|---|---|---|---|---|---|---|---|---|---|---|---|---|---|---|
| | NR | PAN | HEA | | | | Type | Percent | | | | | | | |
| 1 | 20 | 60 | 20 | 70 | 0.75 | 0.75 | CaCO₃ | 20 | 241 | 3,300 | 4,080 | 4 | >500 | 85 | |
| 2 | 20 | 60 | 20 | 70 | 0.75 | 0.76 | CaCO₃ | 40 | 439 | 3,410 | 3,510 | 2 | >500 | 90 | |
| 3 | 20 | 60 | 20 | 70 | 0.75 | 0.75 | Glass spheres | 20 | 226 | 3,900 | 4,200 | 7 | >500 | 83 | |
| 4 | 20 | 60 | 20 | 70 | 0.75 | 0.76 | ....do...... | 40 | 387 | 4,120 | 4,500 | 4 | >500 | 86 | |
| 5 | 20 | 60 | 20 | 70 | 0.75 | 0.75 | Glass strands | 20 | 237 | 2,700 | 4,300 | 6 | >500 | 81 | |
| 6 | 20 | 60 | 20 | 70 | 0.75 | 0.75 | Silica | 20 | 171 | 3,590 | 2,840 | 11 | >500 | 85 | |
| 7 | 20 | 60 | 20 | 70 | 0.75 | 0.76 | ....do...... | 40 | 428 | 4,400 | 6,280 | 6 | >500 | 89 | |
| 8 | 20 | 60 | 20 | 70 | 0.75 | 0.75 | Talc | 20 | 322 | 1,810 | 2,640 | 1 | >500 | 82 | |
| 9 | 20 | 60 | 20 | 70 | 0.75 | 0.76 | ....do...... | 40 | 445 | 1,840 | 2,740 | 1 | >500 | 83 | |
| 10 | 20 | 60 | 20 | 70 | 0.78 | 1.0 | Asbestos | 20 | 241 | 3,840 | 5,410 | 5 | | 86 | 5.3378 |
| 11 | 20 | 60 | 20 | 70 | 0.78 | 1.0 | ....do...... | 40 | 450 | 5,090 | 6,290 | 6 | | 90 | 1.5249 |
| 12 | 20 | 60 | 20 | 70 | 0.56 | 0.5 | | | 109 | 3,150 | | 21 | >500 | 80 | 1.1718 |

ᵃ Where the amount of filler is 20%, 1.25 parts per 100 parts of the resin portion of tris(2-methoxyethoxy) silane was employed as an adhesion promoting agent. Where the amount of filler is 40%, 1.67 parts of adhesion promoter was used.

From Table V it can be seen that the filled samples exhibit reduced percent elongation but increased hardness, density and flexural modulus when compared with a similar but unfilled sample (Run 12).

EXAMPLE VI

This examples illustrates the properties exhibited by the thermoset resin when the thermosetting composition contained a crosslinking agent such as divinylbenzene (DVB) and was combined with a filler.

TABLE VI

| Run | Resin portion | | | | Percent AN | IV, PAN | IN. (phr) | Filler | | FM (p.s.i.×10⁻³) | T (p.s.i.) | FS (p.s.i.) | E, percent | H | Density |
|---|---|---|---|---|---|---|---|---|---|---|---|---|---|---|---|
| | NR | PAN | HEA | DVB | | | | Type | Percent | | | | | | |
| 1 | 20 | 60 | 16 | 4 | 70 | 1.02 | 2.0 | Asbestos | 20 | 368 | 4,580 | 4,330 | 5 | 85 | 1.3472 |
| 2 | 20 | 60 | 16 | 4 | 70 | 1.02 | 2.0 | ....do...... | 40 | 559 | 4,830 | 5,590 | 4 | 85 | 1.4932 |
| 3 | 20 | 60 | 16 | 4 | 70 | 1.02 | 2.0 | Silica | 20 | 318 | 4,450 | 5,170 | 5 | 82 | 1.3262 |
| 4 | 20 | 60 | 16 | 4 | 70 | 1.02 | 2.0 | ....do...... | 40 | 470 | 4,500 | 3,410 | 4 | 85 | 1.4652 |
| 5 | 20 | 60 | 16 | 4 | 70 | 1.02 | 2.0 | Clay | 20 | 326 | 3,650 | 3,570 | 4 | 84 | 1.3302 |
| 6 | 20 | 60 | 16 | 4 | 70 | 1.02 | 2.0 | ....do...... | 40 | 635 | 3,580 | 4,590 | 3 | 86 | 1.4932 |
| 7 | 20 | 60 | 16 | 4 | 70 | 1.02 | 2.0 | | | 260 | 3,390 | 4,430 | 4 | 81 | 1.1722 |

ᵃ Where the amount of filler is 20%, 1.25 parts per 100 parts of the resin portion of tris(2-methoxyethoxy) silane was employed as an adhesion promoting agent. Where the amount of filler is 40%, 1.67 parts of adhesion promoter was used.

From Table VI it can be seen that the filled samples exhibit increased density, hardness and flexural modulus when compared with a similar but unfilled sample (Run 7).

EXAMPLE VII

This example illustrates the properties exhibited by the thermoset resin when the thermosetting composition utilized a polyacrylonitrile of high inherent viscosity and was combined with a filler. The runs were done with and without a crosslinking agent.

TABLE VII

| Run | Resin portion | | | | Percent AN | IV, PAN | IN. (phr) | Filler | | FM (p.s.i.×10⁻³) | T (p.s.i.) | FS (p.s.i.) | E, percent | H | Density |
|---|---|---|---|---|---|---|---|---|---|---|---|---|---|---|---|
| | NR | PAN | HEA | DVB | | | | Type | Percent | | | | | | |
| 1 | 20 | 60 | 20 | 0 | 70 | 5.36 | 2.0 | Asbestos | 40 | 438 | 4,060 | ,050 | 4 | 80 | 1.3502 |
| 2 | 20 | 60 | 20 | 0 | 70 | 5.36 | 2.0 | Silica | 40 | 373 | 3,470 | 6,570 | 4 | 84 | 1.4262 |
| 3 | 20 | 60 | 20 | 0 | 70 | 5.36 | 2.0 | Clay | 40 | 327 | 3,160 | 4,090 | 4 | 83 | 1.4662 |
| 4 | 20 | 60 | 16 | 4 | 70 | 5.36 | 2.0 | Asbestos | 40 | 575 | 4,050 | 6,090 | 4 | 81 | 1.4342 |
| 5 | 20 | 60 | 16 | 4 | 70 | 5.36 | 2.0 | Silica | 40 | 446 | 3,730 | 4,490 | 3 | 85 | 1.2742 |
| 6 | 20 | 60 | 16 | 4 | 70 | 5.36 | 2.0 | Clay | 40 | 457 | 2,770 | 3,510 | 2 | 85 | 1.3992 |
| 7 | 20 | 60 | 20 | 0 | 70 | 5.36 | 2.0 | | | 160 | 3,510 | 4,850 | 9 | 76 | 1.1742 |

ᵃ In these runs 1.67 parts of tris(2-methoxyethoxy) silane per 100 parts of the resin portion were used as an adhesion promoting agent.

From Table VII it can be seen that these filled samples exhibit lower elongation, have a higher density, and increased hardness and flexural modulus compared to a similar composition not containing a filler (Run 7).

Using the thermosetting compositions and thermosetting process described above, new thermosetting resins containing polymerized acrylonitrile may be obtained. The properties of these resins, such as high Vicat softening temperature, improved hardness, flexural strength and tensile strength and the inherent resistance to oils for resins containing acrylonitrile, create for them particular utility wherever these properties are desired. For example, they may be used to make molded plastic parts used in and about internal combustion engines such as battery cases and distributor caps since high temperature stability and resistance to oil is essential for long life.

I claim:

1. A thermosetting composition consisting essentially of
   (a) a resin portion comprising (1) a monomeric hydroxyalkyl ester of an unsaturated acid of the formula

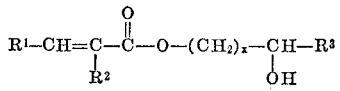

wherein $R^1$, $R^2$, and $R^3$ may be the same or different and are selected from the group consisting of hydrogen and alkyl radicals having 1 to 5 carbon atoms and $x$ is an integer having a value from 0 to 4 and
   (2) a polymer of acrylonitrile selected from polyacrylonitrile and a blend of polyacrylonitrile with a copolymer of acrylonitrile and a conjugated diene having 4 to 10 carbon atoms and
   (b) an organic peroxide capable of initiating a free radical polymerization.

2. A thermosetting composition according to claim 1 wherein of 100 parts by weight of the resin portion the polymer of acrylonitrile comprises 50 to 95 parts by weight and the monomeric hydroxyalkyl ester comprises 5 to 50 parts by weight and the amount of said organic initiator does not exceed about 8 parts per 100 parts resin portion.

3. A thermosetting composition according to claim 1 wherein the mole ratio of acrylonitrile to conjugated diene in the copolymer varies from 0.25 to 3.

4. A thermosetting composition according to claim 1 wherein
   (a) the hydroxyalkyl ester is selected from 2-hydroxyethyl acrylate and 3-hydroxypropyl acrylate,
   (b) the polymer of acrylonitrile is selected from polyacrylonitrile and a blend of polyacrylonitrile with a copolymer of acrylonitrile and butadiene having a monomer ratio of 1, and (c) the organic peroxide is 2,5-bis(t-butylperoxy)-2,5-dimethylhexane.

5. A thermosetting composition according to claim 1 wherein the composition further contains a crosslinking agent having two or more polymerizable unsaturated carbon-carbon bonds.

6. A thermosetting composition according to claim 5 wherein the crosslinking agent is divinylbenzene.

7. A thermosetting composition according to claim 1 wherein, in 100 parts by weight of said composition, (a) said hydroxyalkyl ester is selected from 2-hydroxyethyl acrylate and 3-hydroxypropyl acrylate, and comprises 10 to 40 parts by weight, (b) said polymer of acrylonitrile is comprised of
  (A) polyacrylonitrile, which comprises 60 to 90 parts by weight,
  (B) a copolymer of acrylonitrile and butadiene having a monomer ratio of 1, which comprises 0 to 30 parts by weight, and (c) in addition said resin portion contains 0 to 10 parts by weight of divinylbenzene, and the organic initiator is 2,5-bis(t-butylperoxy)-2,5-dimethylhexane in an amount from 0.5 to 3 parts per 100 parts of said resin portion.

8. A thermosetting composition according to claim 1 wherein the thermosetting composition is combined with a filler in an amount not exceeding about 40 weight percent of the combined weight of filler and thermosetting composition.

9. A thermosetting composition according to claim 8 wherein the filler is selected from the group consisting of calcium carbonate, asbestos, talc, silica, clay, glass strands and glass spheres.

10. A thermosetting composition according to claim 7 wherein said composition contains a filler selected from the group consisting of calcium carbonate, asbestos, talc, silica, clay, glass strands and glass spheres in an amount not exceeding about 40 weight percent of the combined weight of filler and thermosetting composition.

11. A thermosetting composition according to claim 10 wherein the composition further contains up to 2 parts per 100 parts of said resin portion of an adhesion promoting agent.

12. A thermosetting composition according to claim 11 wherein the adhesion promoting agent is tris(2-methoxyethoxy) silane.

13. A process for the preparation of a thermoset resin comprising subjecting the thermosetting composition of claim 1 to a temperature from 300–500° F. and a pressure from 10,000 to 75,000 p.s.i.g.

14. A process for the preparation of a thermoset resin comprising subjecting the thermosetting composition of claim 5 to a temperature from 300–500° F. and a pressure from 10,000 to 75,000 p.s.i.g.

15. A process for the preparation of a thermoset resin comprising subjecting the thermosetting composition of claim 7 to a temperature from 300–500° F. and a pressure from 10,000 to 75,000 p.s.i.g.

16. A process for the preparation of a thermoset resin comprising subjecting the thermosetting composition of claim 10 to a temperature from 300–500° F. and a pressure from 10,000 to 75,000 p.s.i.g.

17. A process for the preparation of a thermoset resin comprising subjecting the thermosetting composition of claim 11 to a temperature from 300–500° F. and a pressure from 10,000 to 75,000 p.s.i.g.

18. The product of the process of claim 13.
19. The product of the process of claim 14.
20. The product of the process of claim 15.
21. The product of the process of claim 16.
22. The product of the process of claim 17.

References Cited

UNITED STATES PATENTS

| | | | |
|---|---|---|---|
| 3,488,405 | 1/1970 | Trementozzi | 260—879 X |
| 3,432,577 | 3/1969 | Serniuk | 260—879 |
| 3,439,064 | 4/1969 | Makomski et al. | 260—879 |
| 3,079,295 | 2/1963 | Slotterbeck et al. | 260—879 X |
| 3,272,785 | 9/1966 | Lewis et al. | 260—875 R X |
| 3,351,602 | 11/1967 | Dunnovant et al. | 260—881 X |
| 2,905,653 | 9/1959 | Hayes | 260—881 X |
| 2,936,487 | 5/1960 | Poz | 260—41 AG X |
| 3,461,094 | 8/1969 | Wesch | 260—41 AG |
| 3,674,893 | 7/1972 | Nowak et al. | 260—415 R X |

MORRIS LIEBMAN, Primary Examiner

S. M. PERSON, Assistant Examiner

U.S. Cl. X.R.

260—41.5 R, 875, 879